United States Patent
Ragan, Jr. et al.

(10) Patent No.: US 10,902,188 B2
(45) Date of Patent: Jan. 26, 2021

(54) COGNITIVE CLIPBOARD

(71) Applicant: INTERNATIONAL BUSINESS MACHINES CORPORATION, Armonk, NY (US)

(72) Inventors: Richard W. Ragan, Jr., Round Rock, TX (US); Jalal U. Mahmud, San Jose, CA (US); David B. Werts, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 16/105,065

(22) Filed: Aug. 20, 2018

(65) Prior Publication Data

US 2020/0057798 A1 Feb. 20, 2020

(51) Int. Cl.
*G06F 17/00* (2019.01)
*G06F 40/166* (2020.01)
(Continued)

(52) U.S. Cl.
CPC .......... *G06F 40/166* (2020.01); *G06F 40/205* (2020.01); *G06F 40/253* (2020.01);
(Continued)

(58) Field of Classification Search
CPC .... G06F 17/24; G06F 17/2705; G06F 17/274; G06F 40/166; G06F 40/205; G06F 40/253
(Continued)

(56) References Cited

U.S. PATENT DOCUMENTS 6,961,692 B1 * 11/2005 Polanyi ................... G06F 40/35 704/9
9,195,640 B1 * 11/2015 Donneau-Golencer ..................... G06F 16/35
(Continued)

FOREIGN PATENT DOCUMENTS

WO 2010/105265 A2 9/2010

OTHER PUBLICATIONS

Kaur et al., An Analysis of Opinion Mining Research Works based on Language, Writing Style and Feature Selection Parameters, International Journal Advanced Networking Applications 2013, pp. 7-13. (Year: 2013).*

*Primary Examiner* — Cong-Lac Huynh
(74) *Attorney, Agent, or Firm* — Tutunjian & Bitetto, P.C.; Michael A. Petrocelli

(57) ABSTRACT

A method for editing text for sentiment that includes identifying a first block of text for use as a template modeling; and employing sentiment analysis engine (SAE) of the first block of text to establish a model writing style. The method can continue with parsing a second block of text into user text segments for analysis for a writing style of a user; and comparing with a sentiment comparison engine (SCE) the text segments for analysis of user writing style with the model writing style of the user are changed using a plurality of text editing rules. The text editing rules are applied to and change the writing style of user to be substantially similar with the model writing style. The method may continue with editing the second block of user text with a sentiment editor using the plurality of text editing rules to provide that the second block of user text is presented in the model writing style; and changing the second block of user text to align with the model writing style.

17 Claims, 10 Drawing Sheets

(51) Int. Cl.
  *G06F 40/205* (2020.01)
  *G06F 40/253* (2020.01)
  *G06F 40/242* (2020.01)
  *G06F 40/284* (2020.01)
  *G06F 40/289* (2020.01)

(52) U.S. Cl.
  CPC .......... *G06F 40/242* (2020.01); *G06F 40/284* (2020.01); *G06F 40/289* (2020.01)

(58) Field of Classification Search
  USPC .......................................................... 715/271
  See application file for complete search history.

(56) References Cited

U.S. PATENT DOCUMENTS

| | | | | |
|---|---|---|---|---|
| 10,140,290 | B2* | 11/2018 | Carmena | G06F 40/253 |
| 10,387,467 | B2* | 8/2019 | Allen | G06F 16/3329 |
| 2009/0327858 | A1* | 12/2009 | Tsun | G06Q 30/02 |
| | | | | 715/234 |
| 2010/0169078 | A1 | 7/2010 | Vanderwold et al. | |
| 2011/0252160 | A1* | 10/2011 | Wu | G06F 40/143 |
| | | | | 709/246 |
| 2011/0252339 | A1* | 10/2011 | Lemonik | G06F 40/166 |
| | | | | 715/753 |
| 2013/0331132 | A1* | 12/2013 | Goliszewski | H04W 4/12 |
| | | | | 455/466 |
| 2014/0047315 | A1* | 2/2014 | Williams | G06F 17/241 |
| | | | | 715/230 |
| 2014/0114648 | A1* | 4/2014 | Eggink | G06F 17/274 |
| | | | | 704/9 |
| 2016/0062981 | A1* | 3/2016 | Dogrultan | G06F 17/24 |
| | | | | 704/9 |
| 2016/0364380 | A1 | 12/2016 | Korn | |
| 2017/0132208 | A1* | 5/2017 | Adavelli | G06F 17/2735 |
| 2017/0249389 | A1* | 8/2017 | Brovinsky | G06Q 30/02 |
| 2017/0250959 | A1* | 8/2017 | Gordon | G06F 17/24 |
| 2018/0052910 | A1* | 2/2018 | Allen | G06F 16/3329 |
| 2018/0248746 | A1* | 8/2018 | Deluca | H04L 67/22 |
| 2018/0365203 | A1* | 12/2018 | Kirby | G06F 40/169 |
| 2020/0026761 | A1* | 1/2020 | Kamijoh | G06F 40/58 |

* cited by examiner

COGNITIVE CLIPBOARD

BACKGROUND

Technical Field

The present invention generally relates to methods of changing a user's block of text to best match an admired block of text.

Description of the Related Art

Today's cognitive and artificial intelligence systems can read natural text. Cognitive software can also respond either verbally or via text. These systems can understand both a human's typed, as well as spoken, word. However, writing styles for textual communication vary similar to the personalities of different people. Although the rules of grammar can be taught, writing styles are not easily emulated.

SUMMARY

In accordance with an embodiment of the present disclosure, a method for editing text for sentiment that includes identifying a first block of text for use as a template modeling; and employing sentiment analysis engine (SAE) of the first block of text to establish a model writing style. The method can continue with parsing a second block of text into user text segments for analysis for a writing style of a user; and comparing with a sentiment comparison engine (SCE) the text segments for analysis of user writing style with the model writing style of the user employing a plurality of text editing rules for said analysis. The text editing rules are applied against the writing style of user to modify said style to better match the model writing style. The method may continue with editing the second block of text with a sentiment editor using the plurality of text editing rules to change that the second block of text to more approximate the model writing style; and presenting the second block of text in the model writing style to the user.

In another aspect, a system is provided for editing text for sentiment. The system may include a sentiment analysis engine (SAE) for analyzing a first block of text as a template model, wherein from the analysis of the first block of text a model writing style is established; and a text segmenting application for parsing a second block of text into user text segments for analysis for a writing style of a user. The system may also include a sentiment comparison engine (SCE) for comparing text segments for analysis of user writing style with the model writing style of the user to determine a plurality of text editing rules to modify said writing style of user to be substantially similar with the model writing style; and a sentiment editor for editing the second block of text with using the plurality of text editing rules to change the second block of text to best match the model writing style. The system further includes a display interface for presenting the second block of text in the model writing style to the user.

In yet another aspect, a computer program product is provided for editing text for sentiment. The computer product may include a non-transitory computer readable storage medium having a computer readable program for providing a method of editing text. The computer readable program when executed on a computer causes the computer to perform the steps of editing text for sentiment that includes identifying a first block of text for use as a template modeling; and employing sentiment analysis engine (SAE) of the first block of text to establish a model writing style. The method can continue with parsing a second block of text into user text segments for analysis for a writing style of a user; and comparing with a sentiment comparison engine (SCE) the text segments for analysis of user writing style with the model writing style of the user to determine a plurality of text editing rules. The text editing rules modify the writing style of user to be substantially similar with the model writing style. The method continues with editing the second block of text with a sentiment editor using the plurality of text editing rules to change that the second block of text to the model writing style; and presenting the second block of text in the model writing style to the user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
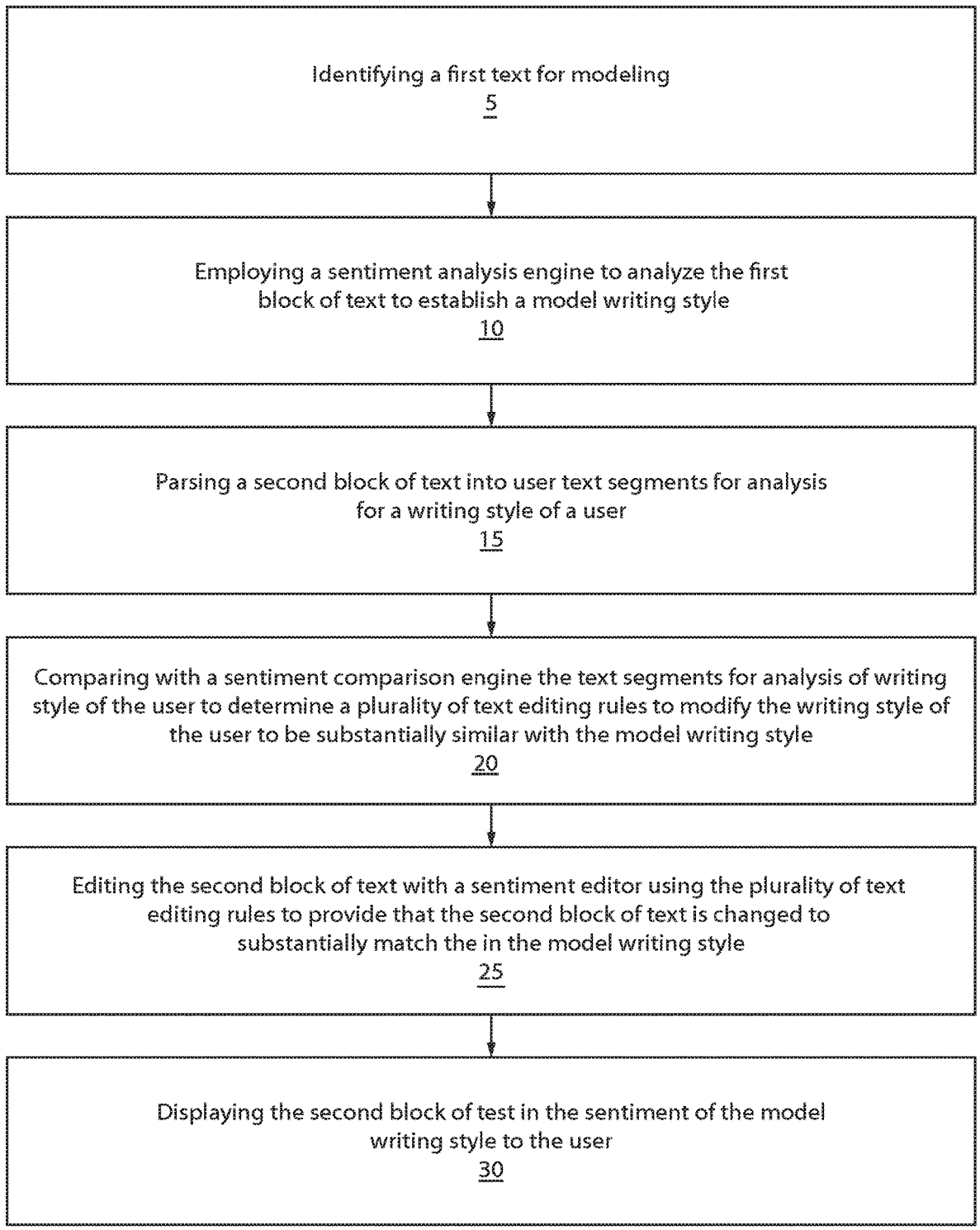
FIG. 1 is a flow diagram showing one embodiment of a method for editing text for sentiment, in accordance with one embodiment of the present disclosure.

The methods, systems, apparatus and computer program products described herein relate to a cognitive system that can be employed for a user to emulate the tone, personality, and writing style of a well-known and admired piece of text. The "clipboard" concept is an interface function that one can employ to select (or copy) text from one document, and paste it into the interface for modification. Cognitive and artificial intelligence systems can read natural text, and these systems can parse and understand the tone, personality, and deep writing style of text. As will be described in further detailed below, this information can then be used first to analyze and secondly to modify text to match the tone, personality, and writing style of the admired text.

This disclosure proposes a method to identify a block of text, e.g., a sentence, a paragraph, a chapter, or even an entire book, and use that tone and style to update the text that the writer wishes to improve. As will be further described below, the methods, systems and computer program products provide a cognitive system that does not simply update adjectives and adverbs, but understands the tone of both the admired document as well as the document to be improved. This can be accomplished with text as typed or text as spoken. A well-trained cognitive system will be able propose new hypothesis (i.e., idea, update, inflection) that would more closely match the admired document. If the writer approves it, then the hypothesis is accepted and further used. The single-user system would be sync-ed up with all other similar systems from a central point that would learn which hypotheses are accepted the most and build collectively on those successful ideas.

More specifically, the method allows for the user to select an example writing style, e.g., admired text, from an existing document or block of text, and then automatically apply that style to text, i.e., current text, that is produced by the user. In some embodiments, the text is updated with the selected style and visually depicted on an application running on a graphic user interface so that it can be reviewed by the user. The methods, systems and computer program products are not described with greater detail with reference to FIGS. 1-13.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a flow diagram showing one embodiment of a method for editing text for sentiment. The term "sentiment" denotes style, tone, word usage in a communication. The method can begin with block 5 that includes identifying a first text for use modeling. The cognitive clipboard includes an application when a user, i.e., the current writer who is a person that has just written current text, wants to change the "sentiment" of the current text. The term "current text" means the words the current writer has written that the writer wishes to change in tone, style, readability, etc . . . what is referred to herein as "sentiment" . . . to be substantially similar to the tone, style readability, i.e., sentiment, of an admired piece of text. By "admired piece of text" it is meant the sentiment, i.e., word usage, writing style, tone, etc., that the current writer wishes to employ in his own piece of text, i.e., current text. These sentences will be used by the Cognitive Clipboard as the "to-be" or target. For example, a current writer might want to improve his writing to emulate a famous writer. The current writer could point to a web site, or to a technical PDF document, or any random piece of text written by the famous writer of interest, or written in the writing style of the famous writer, and that can be used as the model writing style. The cognitive clipboard may extract the model style from the admired text, and then modify the current text from the current writer in the writing style of the admired text.

Figure 2:
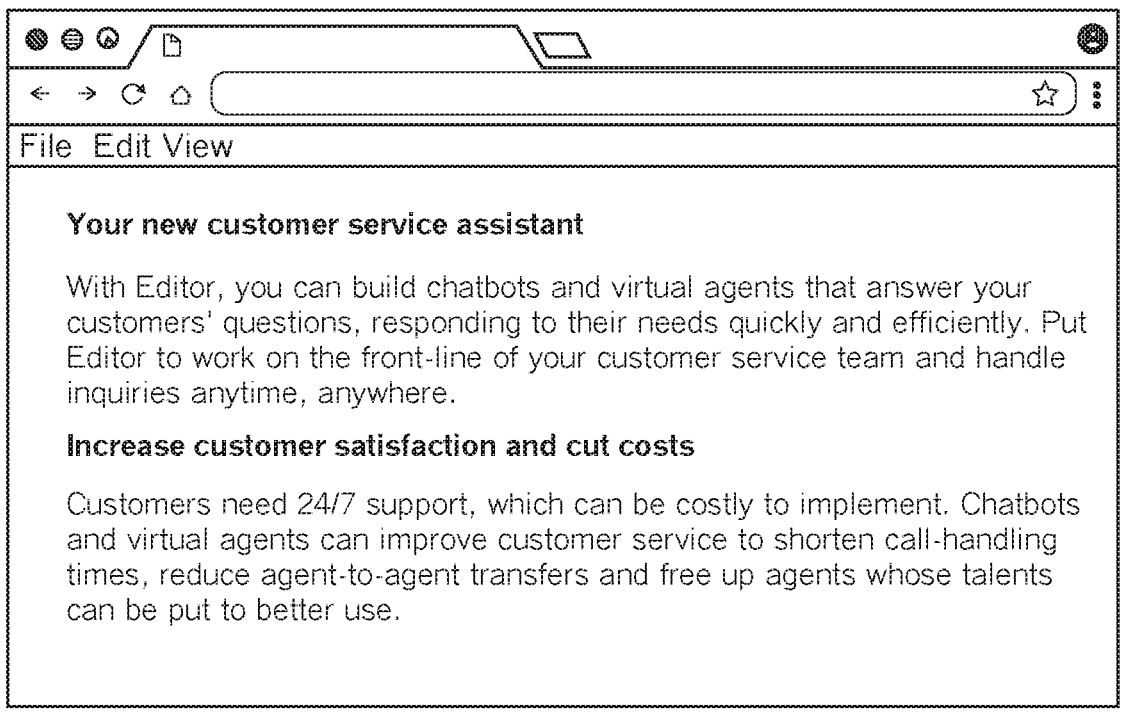
FIG. 2 is an exemplary screen shot of an application running on graphic user interface of a display illustrating the current text that the current writer has entered into the application, in accordance with one embodiment of the present disclosure.

FIG. 2 illustrates one embodiment could be a word processor into which text can be typed. Another example could be a data entry field within an application that is running on a graphic user interface (GUI) of a display, in which the data entry field is for entry of text, i.e., current text, from the current writer. In this example, the user may either type this text into a text box, paste text into a text box, or the user may speak and the text may be recorded in the text box, as it is not required that the current user actually type the text, or provide typed text using cut and paste functions. As described throughout, the current user wants to update this writing from another, more skilled, writer's paragraphs.

Figure 3:
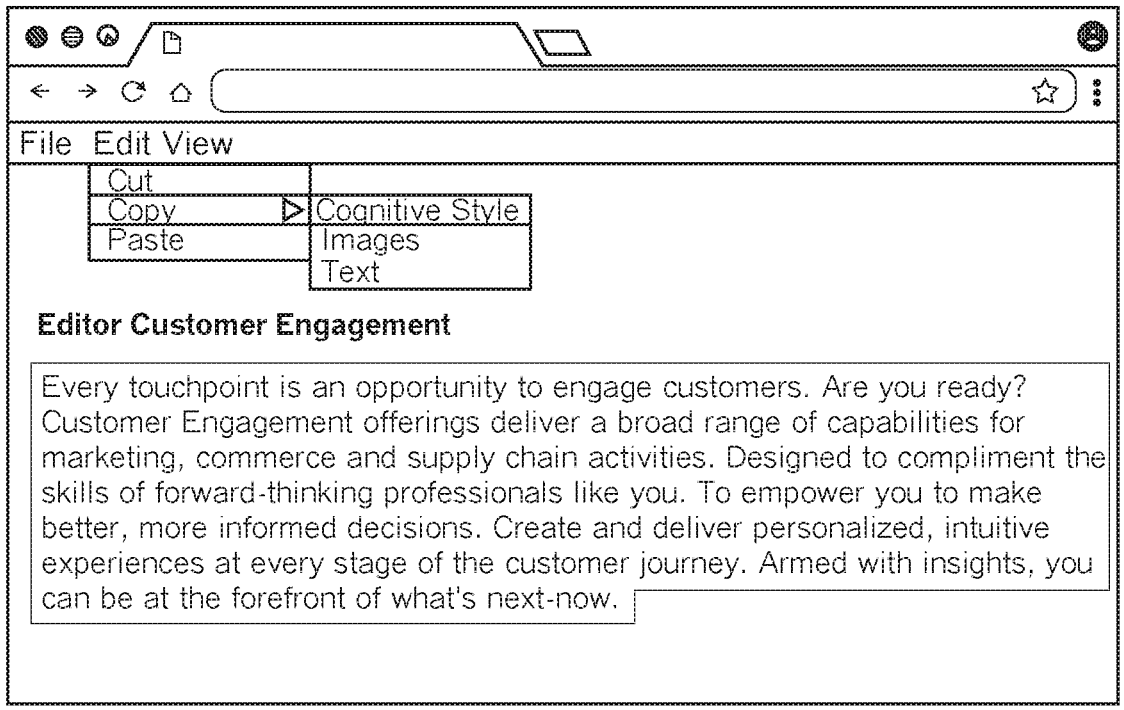
FIG. 3 is a screen shot of an application running on a graphic user interface of a display illustrating the admired text the current writer wants to use as a template for extracting the model writing style to be applied to the current text that was entered into the application by the current writer.

Referring to FIG. 3, the current user may then identify text for use in providing a model writing style. The text identified at this stage is the "admired text". The admired text being the text that the current user would like to emulate, i.e., the text the current user has entered into the word processor or other text field as depicted in FIG. 2.

The admired text may be text from a specific author. The admired text may be selected from text for a specific application, such as preparing text for a manual, an advertisement, an invitation, a letter, etc. The admired text may be selected for text from a specific field. For example, the admired text can be selected to provide the proper writing style for documents in marketing fields, documents in legal field, technical documents, medical billing documents, technical manuals, educational text, human resource fields, etc. The admired text may be text that the current writer, i.e., user enters into the application, or can be text that the current writer selects from a database that the application can access.

FIG. 3 shows one example of an admired text that the current writer would use as a template for their text, i.e., the current text. In some embodiments, the user, i.e., current user, can swipe the text, i.e., highlight either by touch interface or by highlight via a mouse or joystick interface with the application running on the GUI, to select the parts that the current writer is interested in appropriating. The current writer, i.e., user, can access the application and copy this information (which could be just text, or it could be text and images, or it could be an elaborate multi-media presentation).

The highlighted text from the admired text may be referred to as a block of text. The block of text may be a sequence of words, a single sentence, multiple sentences, a single paragraph, multiple paragraphs, a single page, multiple pages, or an entire document, such as a book, technical periodical and/or magazine.

Referring to FIG. 1, the method may continue with block 10, which includes employing a sentiment analysis engine to analyze the first block of text to establish a model writing style. The sentiment analysis engine may include a special purpose hardware processor and memory, in which the memory includes instructions for analyzing blocks of text to establish a model writing style.

The sentiment analysis engine may include a lexical annotator generator, a parsing rule annotator generator and one or more dictionaries of base patterns to analyze the first block of text to establish a model writing style. In one example, the sentiment analysis engine can employ natural language processing, such as unstructured information management architecture (UIMA), to analyze the first block of text, but it is noted that the methods, structures and computer program products of the present disclosure are not limited to only this example. Unstructured information management architecture (UIMA) may be described as a software architecture that uses analytics for the analysis of unstructured information. In some embodiments, the sentiment analysis engine uses standard UIMA annotators with parsing rules that are specifically tailored to detect sentiment in the admired text. The lexical annotator generator and the parsing rule annotator generator are used to build custom text analytics annotators for UIMA pipelines. Text analytics may be used in environments in which linguistic grammars, dictionaries, and parsing rules are utilized to help discover meaning of text sources. The annotator may be described as a collection of character and/or parsing rules that are related in some way. The UIMA framework uses these annotators to help find matches in the text being analyzed. When a match is found (i.e., when an annotator rule is satisfied), an annotation is recorded in a Common Analysis Structure (CAS) that identifies the match, its location in the text, etc. Thus, the annotator is a tool to help find matches. An annotation may be described as the match that has been found and noted in the CAS.

Figure 4:
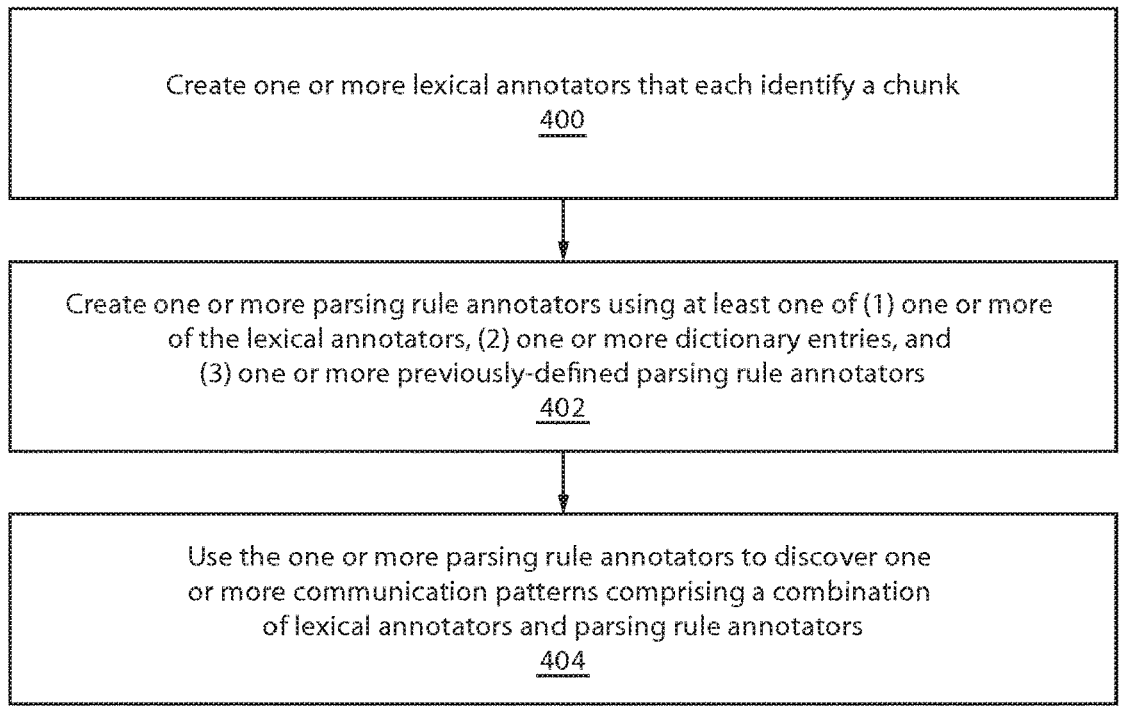
FIG. 4 illustrates, in flow diagram, operations performed to locate a communication pattern in analytic text, in accordance with certain embodiments.

FIG. 4 illustrates, in a flow diagram, operations performed to locate a communication pattern in analytic text in accordance with certain embodiments. Control begins at block 400 with creation of one or more lexical annotators that each identify a chunk of text from the admired text. In block 402, one or more parsing rule annotators are created using at least one of (1) one or more of the lexical annotators, (2) one or more dictionary entries, and (3) one or more previously-defined parsing rule annotators. In block 404, the one or more parsing rule annotators are used to discover one or more communication patterns comprising a combination of lexical annotators and parsing rule annotators. The process flow depicted in FIG. 4 determines patterns, which are then turned into rules regarding the communication.

Figure 5:
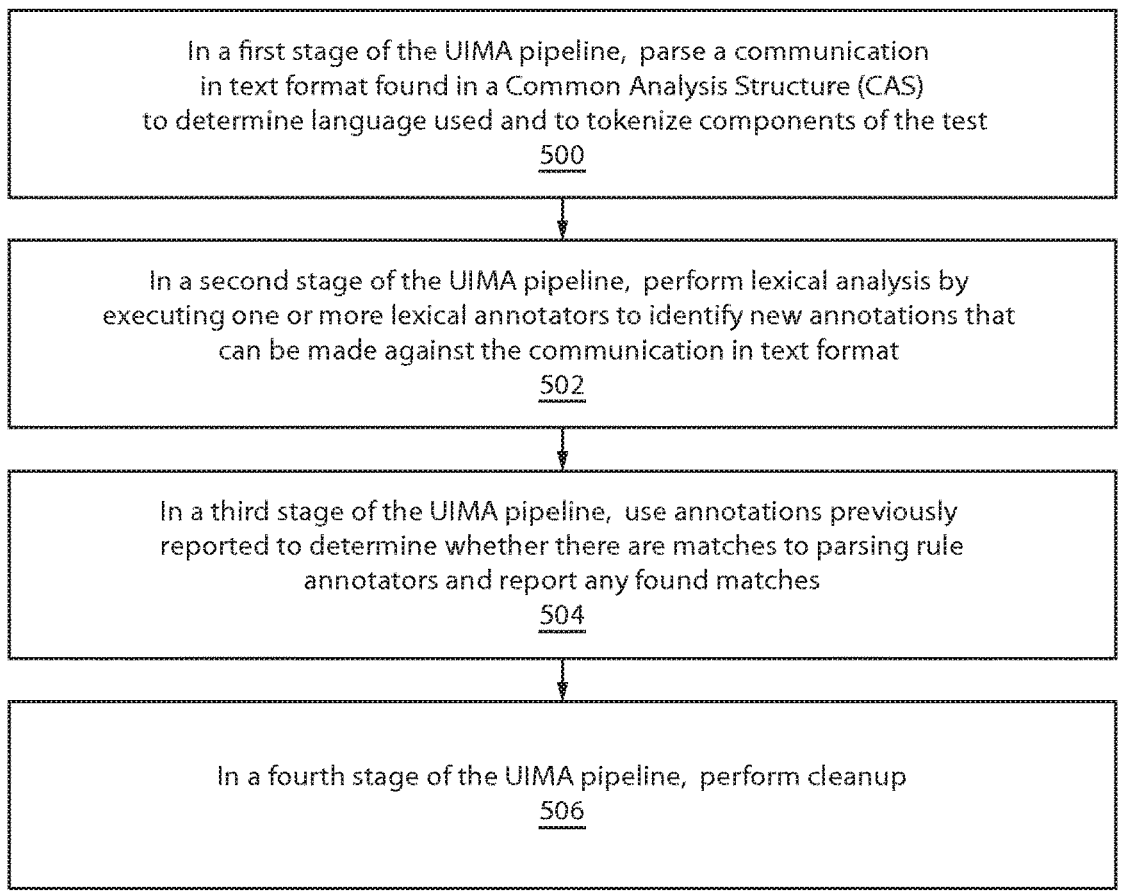
FIG. 5 illustrates, in a flow diagram, operations performed to use natural language processing, such as Unstructured Information Management Architecture (UIMA) pipeline, in accordance with certain embodiments.
Figure 6:
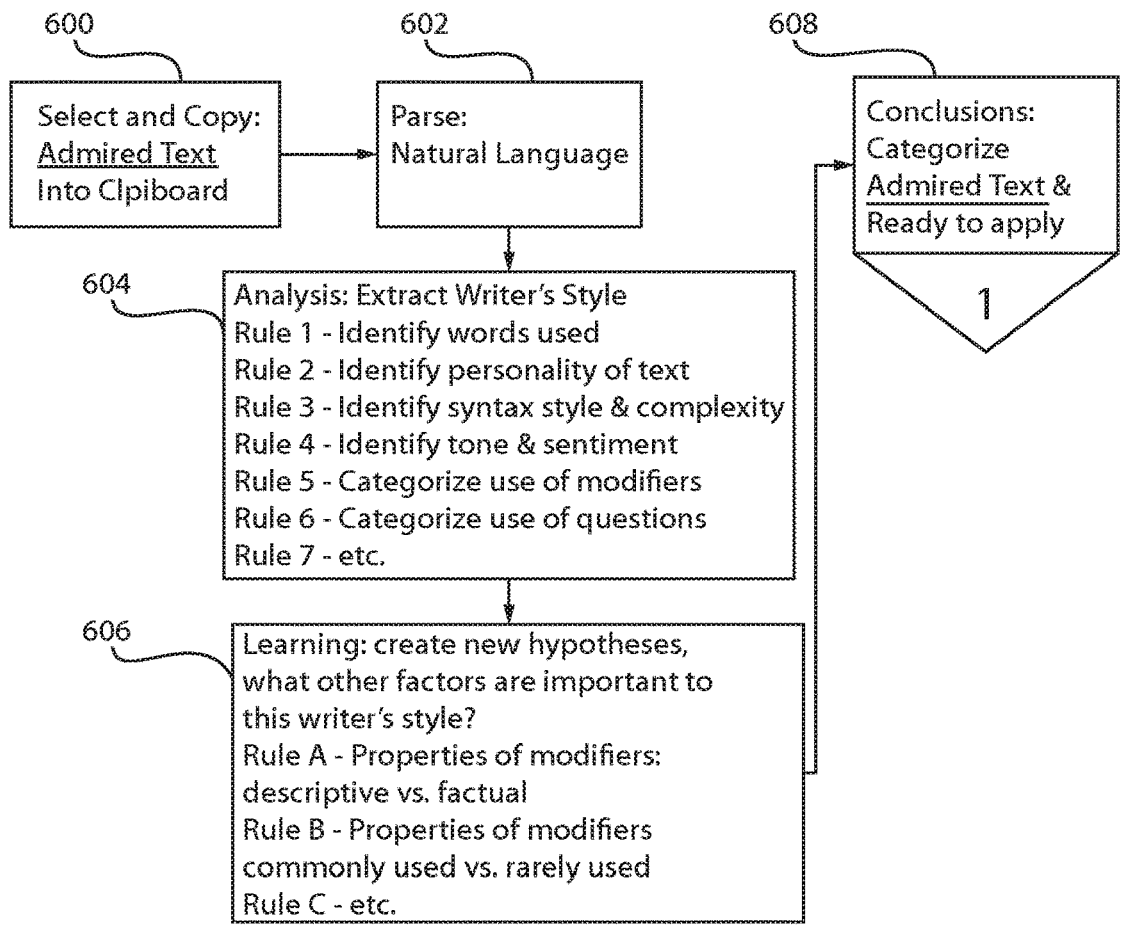
FIG. 6 is a flow chart illustrating select, copy, parse and conclusion process steps for analyzing admired text for a model writing style.

FIG. 5 illustrates, in a flow diagram, operations performed to use an Unstructured Information Management Architecture (UIMA) pipeline in accordance with certain embodiments. Control begins at block 500, where, in a first stage of the UIMA pipeline, communication in text format found in a Common Analysis Structure (CAS) is parsed to determine language used and to tokenize components of the text. In block 502, in a second stage of the UIMA pipeline, lexical analysis is performed by executing one or more lexical annotators to identify new annotations that can be made against the communication in text format. In block 504, in a third stage of the UIMA pipeline, annotations previously reported are used to determine whether there are matches to parsing rule annotators and any found matches are reported. In block 506, in a fourth stage of the UIMA pipeline, a cleanup is provided, and the model writing style is provided. The rules from the patterns in FIG. 4 are converted into conclusions regarding the totality of the rules, which provides a model writing style. FIG. 6 is a flow chart illustrating select, copy, parse and conclusion process steps for analyzing admired text for a model writing style. FIG. 6 illustrates how in one embodiment, the current writer copies into the application (also referred the application including the cognitive clipboard), the text, i.e., admired text that they want to emulate at block 600. This is illustrated further in the screen shot that is described in FIG. 3.

Referring to FIG. 6, in some embodiments, the cognitive clipboard begins by parsing the text using its natural language abilities at block 602. The text may be parsed into chunks, e.g., a chunk may be five words. The size of the chunks may be customized. For example, a chunk may be a set of five words. As additional examples, a chunk may be a set of words that ends after a period (i.e., the punctuation "."), after a subject, after a verb, after a predicate, etc. In certain embodiments, the chunks are specific word clusters of interest (i.e., logical sections of text in which sentiment indicators are changing).

Referring to FIG. 6, in some embodiments, a host of rules are applied at block 604. These rules have been verified to work in understanding the style, tone, personality, and details of how the Admired Text is written. This step has been described above with reference to FIG. 4. FIG. 4 illustrates, in a flow diagram, operations performed to locate a communication pattern in analytic text, e.g., admired text.

Referring back to FIG. 6, after the standard, accepted, rules have parsed the text, the cognitive system, fully capable of machine learning, begins to parse with its proposed rules at block 606. These rules are hypotheses for the Cognitive Clipboard, and their creation has been further described with reference to FIG. 5. The hypotheses for the cognitive clipboard arrive at conclusions at step 608. FIG. 6 summarizes at least one embodiment for extracting a model writing style from a portion of admired text, which has been described above with reference to FIGS. 1, 3, 4 and 5.

Figure 7:
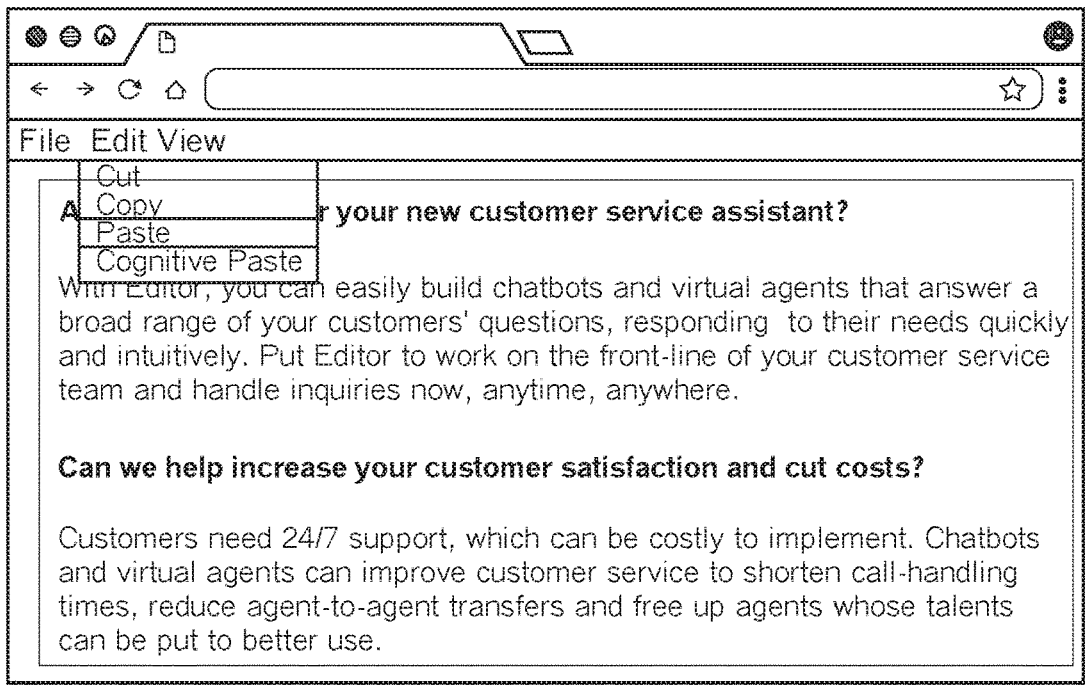
FIG. 7 is a screen shot of the clipboard application illustrating the current text with portions that the current writer wishes to modify being highlighted.

Referring to FIG. 1, the method can continue with parsing a second block of text into user text segments for analysis for a writing style of a user at block 15. The second block of text may be a word sequence, a single sentence, a plurality of sentences, a paragraph, a page, etc. FIG. 7 is a screen shot of the application illustrating the current text with portions that the current writer wishes to modify being highlighted. FIG. 7 is back to the current text that was first depicted in FIG. 2. In FIG. 7, the current writer has selected all of the paragraphs they want to modify and then select "Paste" to begin the Cognitive Clipboard modification process. The parse step for dividing the selected text into segments for analysis can be similar to the parse step that is described above with reference to block 602 of FIG. 6.

At block 20 of the method depicted in FIG. 1, the method may continue with comparing with a sentiment comparison engine (SCE) the text segments for analysis of user writing style with the model writing style to determine a plurality of text editing rules. The text editing rules allow for the modification of the writing style of user to be substantially similar with the model writing style. The sentiment comparison engine (SCE) may include a special purpose hardware processor and memory, in which the memory includes instructions for analyzing blocks of text to establish a model writing style.

The sentiment comparison engine (SCE), similar to the sentiment analysis engine that is described above with reference to block 10, may include a lexical annotator generator, a parsing rule annotator generator and one or more dictionaries of base patterns to analyze the first block of text to establish a model writing style. In some embodiments, similar to the sentiment analysis engine, the sentiment comparison engine (SCE) uses standard UIMA annotators with parsing rules that are specifically tailored to detect sentiment in the current text for comparison with the sentiment that was detected from the admired text in block 10 that provided the model writing style. The lexical annotator generator and the parsing rule annotator generator are used to build custom text analytics annotators for UIMA pipelines. Text analytics may be used in environments in which linguistic grammars, dictionaries, and parsing rules are utilized to help deduce the meaning from text sources. The annotator may be described as a collection of character and/or parsing rules that are related in some way. The UIMA framework uses these annotators to help find matches in the text being analyzed. When a match is found (i.e., when an annotator rule is satisfied), an annotation is recorded in a Common Analysis Structure (CAS) that identifies the match, its location in the text, etc. Thus, the annotator is a tool to help find matches. An annotation may be described as the match that has been found and noted in the CAS. Further details for locating communication pattern during block 20 have been described above in block 10, and FIG. 4. Further details for employing unstructured information management architecture (UIMA) to provide the plurality of text editing rules to modify the writing style of the user, i.e., current writer, are substantially similar to the model writing style.

Figure 8:
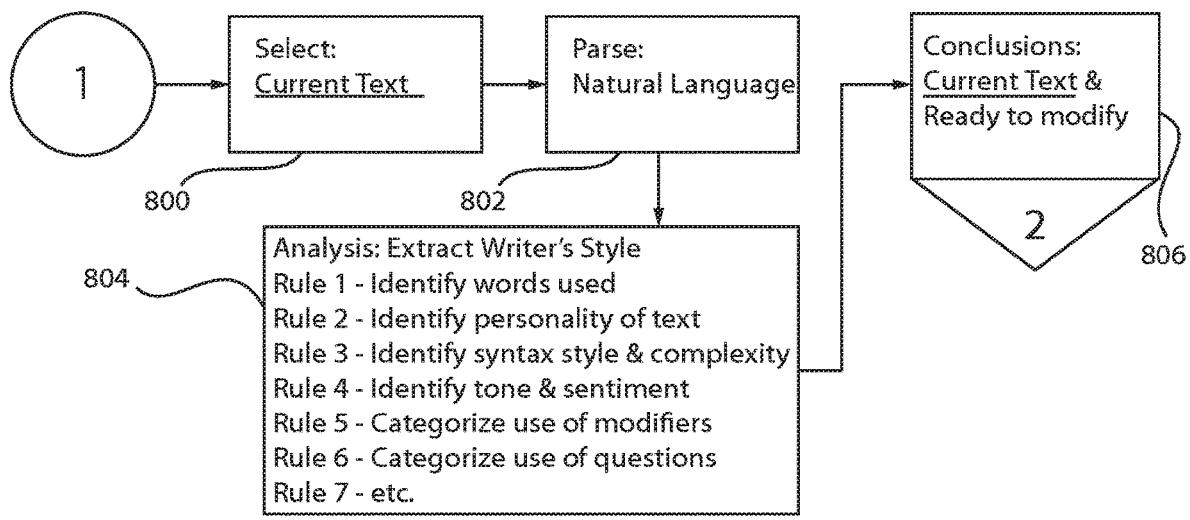
FIG. 8 is a flow chart illustrating select, copy, parse and conclusion process steps for analyzing current text from the user, i.e., current writer, of the clipboard system for a model writing style.

FIG. 8 is a flow chart illustrating select, parse and conclusion process steps for analyzing the current text to analyze the writing style of the current user, as described in block 20 of FIG. 1. FIG. 8 illustrates how in one embodiment, the current writer selects from the current text the portion of the text that the writer wishes to be modified to be in the writing style of the admired text at block 800. This is illustrated further in the screen shot that is described in FIG. 7.

Referring to FIG. 8, in some embodiments, the cognitive clipboard begins by parsing the text using its natural language abilities at block 802. Although this step has already been described in block 15 of FIG. 1., it is included in the process flow of FIG. 8 for completeness.

Referring to FIG. 8, in some embodiments, a host of rules are extracted from the parsed text by the analysis provided by the sentiment comparison engine (SCE) at block 804. These rules are used to extract the writer's style and provide an understanding of the style, tone, personality, and details of how the Current Text is written. The cognitive system, fully capable of machine learning, begins to parse with its proposed rules at block 804, in which the rules for the cognitive clipboard applied to the current text arrive at conclusions at block 806. The conclusions on the rules at block 806 provides the writing style for the current text by the current writer, i.e., user of the clipboard application.

The conclusions provided at block 806 of FIG. 8 for the writing style of current text is then compared by the sentiment comparison engine (SCE) with the conclusions for the model writing style of block 606 of FIG. 6 from the analysis of the admired text. The comparison provides a plurality of text editing rules that can be used to modify the writing style in the current text to be substantially similar to the model writing style that is extracted from the admired text.

The method may continue with block 25 of FIG. 1 with editing the second block of text, i.e., the current text from the current writer, with a sentiment editor using the plurality of text editing rules to provide that the second block of text is presented in the model writing style of the admired text. The sentiment editor can include at least one microprocessor, i.e., a computing device, that present can be present in an integrated circuit that can be is dedicated to perform tasks and execute specific applications, such as the editing of text to provide text is presented in a model writing style consistent with an admired text. In addition to the processor, i.e., hardware processor, the sentiment editor can contain memory that can include instructions for editing text.

Figure 9A:
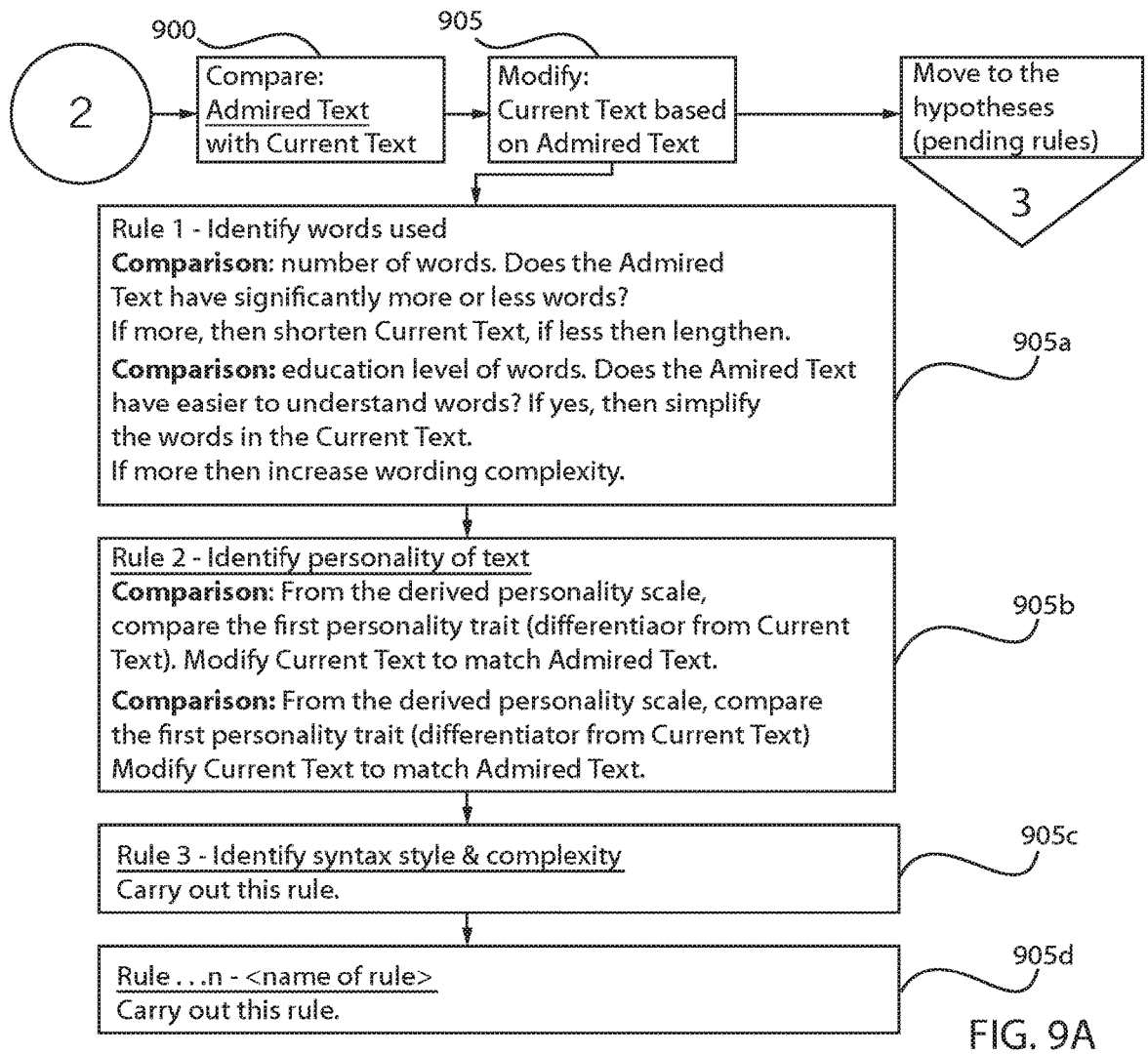
FIG. 9A is a flow chart illustrating the application modifying text in accordance with a model style base upon existing style rules, in accordance with one embodiment of the present disclosure.

The comparison block 20 and the editing block 25 are further described with reference to FIGS. 9A and 9B. FIG. 9A illustrates one embodiment of the comparison work done by the Cognitive Clipboard. Starting from the comparison of the Admired Text with the Current Text at block 900, the system modifies the current text at block 905. More specifically, the sentiment editor addresses each rule 905a, 905b, 905c, 905d one at a time. Each of the rules 905a, 905b, 905c, 905d compare the Admired Text and the Current text on the basis of a stylistic element, such as number or words, education level of words, personality sentiment of the text, etc. The conclusions for the Admired Text from block 608 of FIG. 6 are compared with the conclusions for the Current Text from block 806. Both sets of original words, sentences, or paragraphs that are addressed by this specific rule are identified and the Current Text is modified to match the Admired Text. These modifications are given a priority based on how critical the rule is to match the tone, personality, and style of the Admired Text. The higher priority rules overrule lower priority rules if there is a conflict.

Figure 9B:
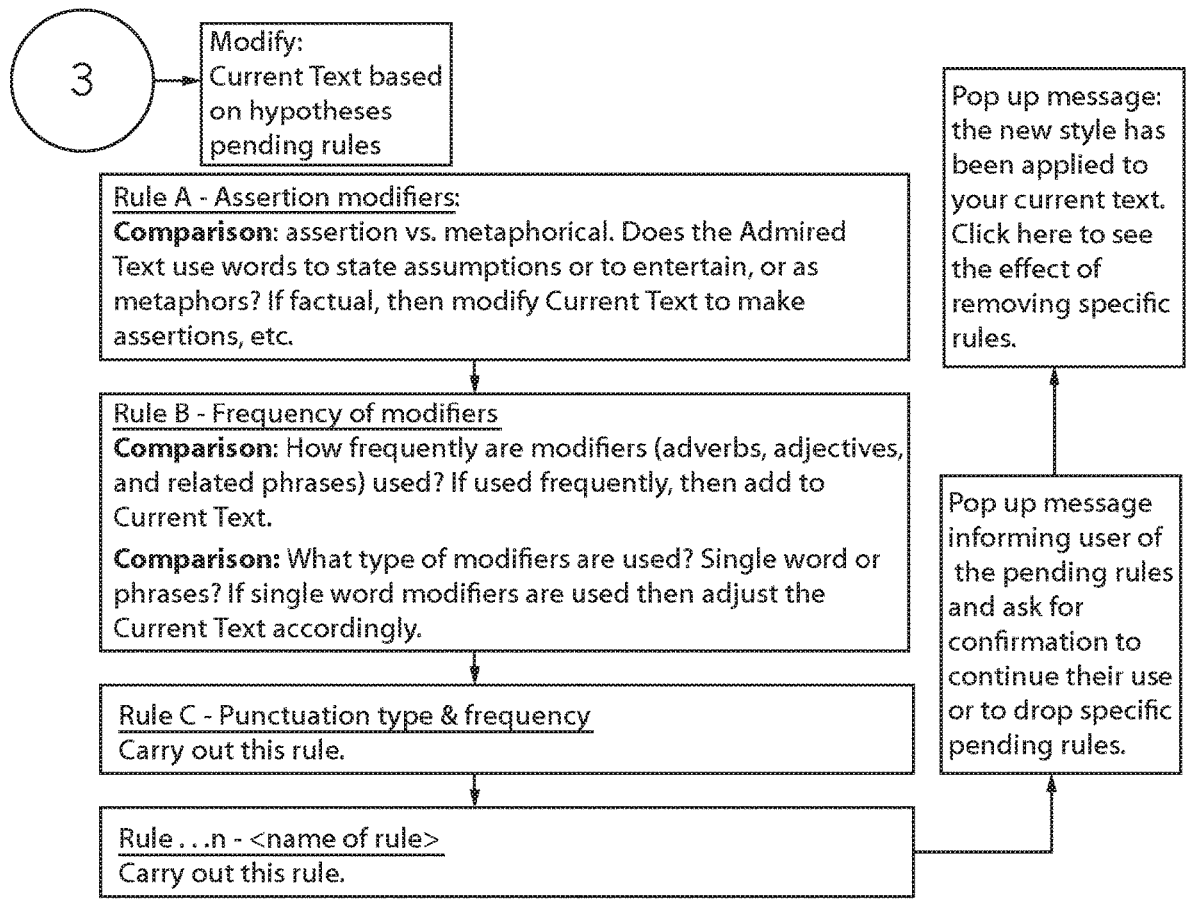
FIG. 9B is a flow chart illustrating the application modifying text in accordance with a model style base upon style rules extracted from an admired and/or model text, in accordance with one embodiment of the present disclosure.

FIG. 9B can be is the final step in the Cognitive Clipboard sequence. After the approved rules have been applied to the Current Text, the hypothetical rules are applied. This step is necessary for the Cognitive Clipboard to keep up with writing styles that change over time. It is also possible that a client Cognitive Clipboard system might find a unique rule that is very salient for a specific type of user.

Referring to FIG. 1, once the proposed rules have been applied, the user is notified that the update to their text has been completed at block 30. The user is informed about the new rules which can be removed to confirm if the user would prefer the text without the new rules. The final message tells the user they can incrementally back out any of the rules in order to better match the style they desire. The can customize the Cognitive Clipboard update and then save those rules as a style profile so the next time they do not have to pull up the same Admired Text.

Figure 10:
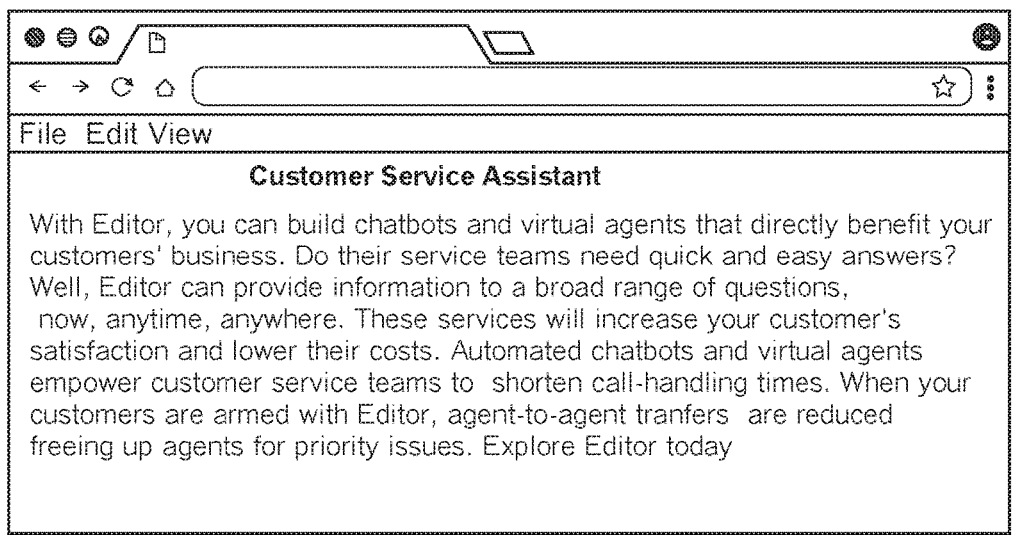
FIG. 10 is a screen shot of the application illustrating modified paragraphs from the current text that have been changed to match the model writing style, in accordance with one embodiment of the present disclosure.

FIG. 10 shows the now-modified paragraphs that have changed to match the Admired Text's point of view, wording, tone, and the personality.

Figure 11:
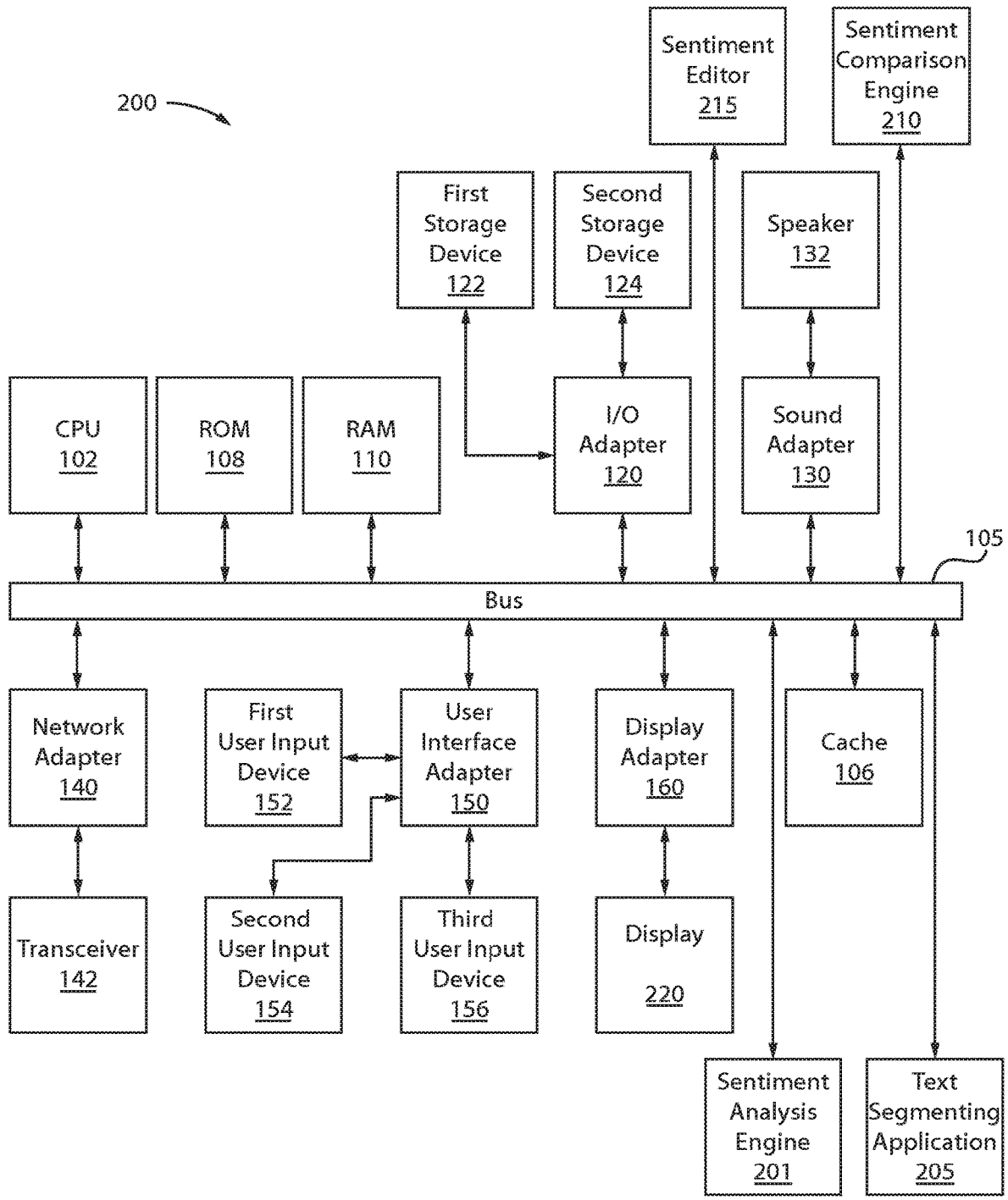
FIG. 11 is a block diagram of a centralized cognitive clipboard service, in accordance with one embodiment of the present disclosure.
Figure 12:
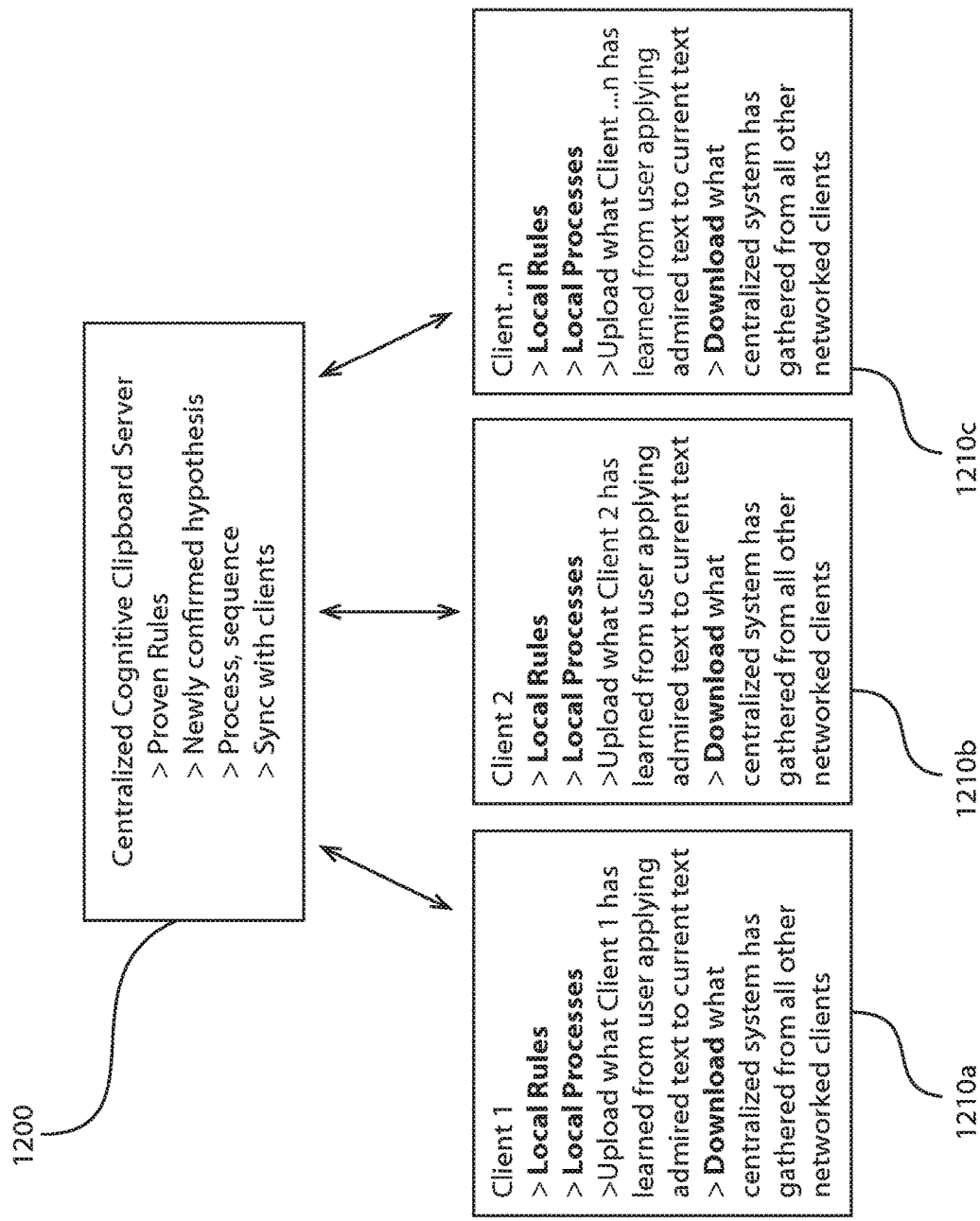
FIG. 12 is a block diagram of an exemplary model of a computer system showing how sentiment analysis, segmenting, and comparisons would integrate into said computer system.

FIG. 11 is a block diagram illustrating one embodiment of a system 200 for editing text for sentiment. The system 200 may include a sentiment analysis engine (SAE) 201 for analyzing a first block of text, i.e., admired text, as a template model, wherein from the analysis of the first block of text a model writing style is established. The sentiment analysis engine (SAE) 201 has been described in more detail with reference to block 10 of FIG. 1, as well as FIGS. 4-6. The system 200 may also include a text segmenting application 205 for parsing a second block of text, i.e., current text entered into the system by a user, i.e., current writer, into user text segments for analysis for a writing style of the user. The text segmenting application 205 has been described in more detail with reference to block 15 of FIG. 1. The sentiment comparison engine (SCE) 210 of the system 200 may be for comparing text segments for analysis of user writing style with the model writing style to determine a plurality of text editing rules to modify said writing style of user to be substantially similar with the model writing style. The sentiment comparison engine (SCE) 210 has been described in more detail with reference to blocks 20 and 25 of FIG. 1, as well as FIGS. 8 and 9A-9B.

Still referring to FIG. 11, the system 200 may further include a sentiment editor 215 for editing the second block of text, i.e., current text provided by the user, i.e., current writer, with using the plurality of text editing rules to provide that the second block of text is presented in the model writing style; and a display interface for presenting the second block of text in the model writing style to the user.

In some embodiments, the sentiment analysis engine (SAE) 201, the text segmenting application 205, the sentiment comparison engine (SCE) 210, the sentiment editor 215, and the display interface 220 of the system 200 are operatively coupled to each other and other components, such as at least one processor (CPU) 104, via a system bus 105. A cache 106, a Read Only Memory (ROM) 108, a Random Access Memory (RAM) 110, an input/output (I/O) adapter 120, a sound adapter 130, a network adapter 140, a user interface adapter 150, a display 30 and a display adapter 160, are also operatively coupled to the system bus 105 of the system 200.

A first storage device 122 and a second storage device 124 are operatively coupled to system bus 105 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 105 by the sound adapter 130. A transceiver 142 is operatively coupled to system bus 105 by network adapter 140. A display 30 is operatively coupled to system bus 105 by display adapter 160.

A first user input device 152, a second user input device 154, and a third user input device 156 are operatively coupled to system bus 105 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 200.

FIG. 11 illustrates one embodiment of a block diagram of a centralized cognitive clipboard service 1200. FIG. 11 is a high-level flow chart that explains how the clients 1210a, 1210b, 1210c would be connected with the systems, methods and structures thereto. Basically, the clients would operate with local rules that best match that specific user. However, the clients 1210a, 1210b, 1210c can be constantly testing new ideas, i.e., hypotheses, to see what this user appreciates or what they do not like. This learning, both the successful rules and the rejected rules, would flow up to the centralized server 1200 so the greater Cognitive Clipboard system and feed the successful rules to clients with similar profiles. Basically, the Cognitive Clipboard system would be a large-scale tool that allows other clients to benefit from the successful hypotheses of other clients 1210a, 1210b, 1210c via the advantages of machine learning. The exemplary model of a computer system 100 showing how sentiment analysis, segmenting, and comparisons would integrate into the computer system 200 that is depicted in FIG. 9 can communicate with the centralized cognitive clipboard service 1200 over the trans-receiver 142.

The method described in FIGS. 1-11 may be embodied as a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
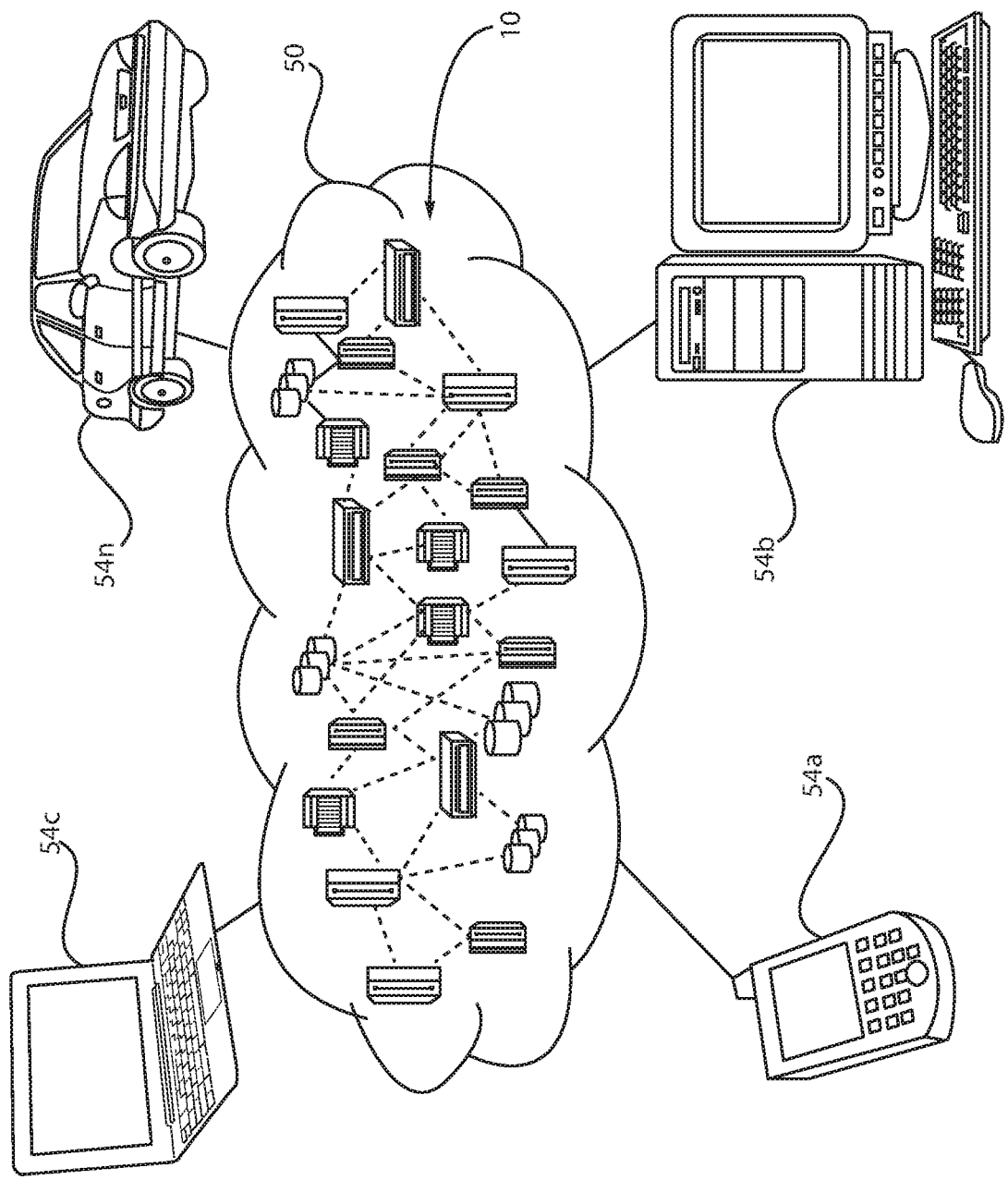
FIG. 13 depicts a cloud computing environment according to an embodiment of the present disclosure.

Referring now to FIG. 13, illustrative cloud computing environment 50 is depicted. As shown, cloud computing environment 50 includes one or more cloud computing nodes 51 with which local computing devices used by cloud consumers, such as, for example, mobile and/or wearable electronic devices 100, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 14:
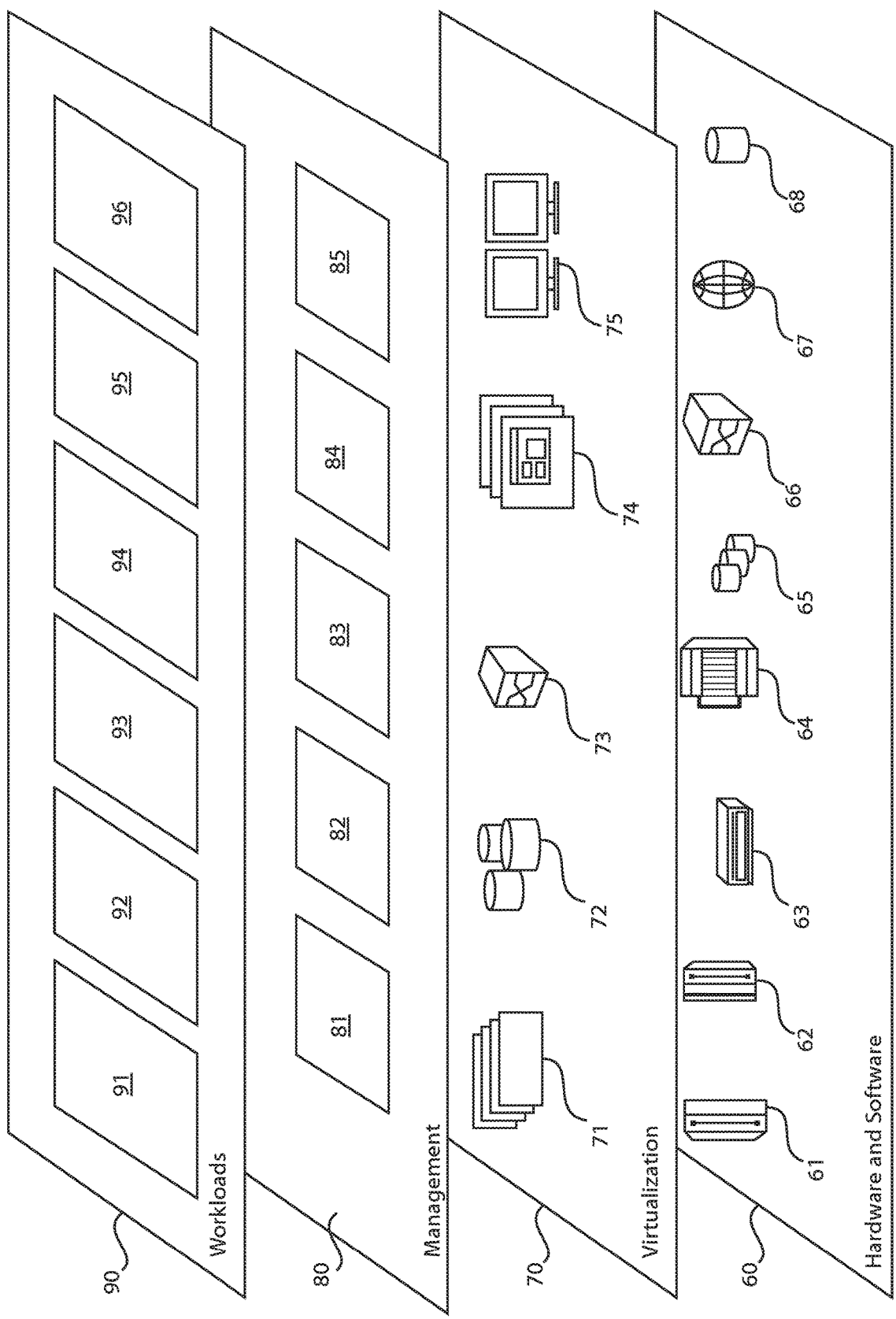
FIG. 14 depicts abstraction model layers according to an embodiment of the present disclosure.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive clipboard application 96, which is described with reference to FIGS. 1-10.

Having described preferred embodiments of a cognitive clipboard (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, is set forth in the appended claims.

The invention claimed is:

1. A method for editing text for sentiment, comprising:
   identifying a first block of text for use as a template modeling;
   selecting a style of a text passage from the first block of text;
   employing sentiment analysis engine (SAE) of the first block of text to establish a model writing style from the style of the text passage selected;
   parsing a second block of text into user text segments for analysis for a writing style of a user;
   comparing with a sentiment comparison engine (SCE) the text segments for analysis of user writing style in comparison with the model writing style to determine a plurality of text editing rules to modify said user writing style to be similar with the model writing style; and
   editing the second block of text with a computer implemented sentiment editor using the plurality of text editing rules to provide that the second block of text is changed to have a revised style with at least one of a message tone, dialect and personality similar to the model writing style.

2. The method of claim 1, wherein the first block of text may be a sentence, paragraph, page or a book of text.

3. The method of claim 1, wherein the parsing the second block of text into text segments, wherein the text segments include segments of a number of words, segments of a number of sentences or segments of a number of paragraphs.

4. The method of claim 1, wherein the model writing style is provided by determining admired text patterns in the first block of text to provide a series of admired text rules, and using natural language processing to provide admired text conclusions.

5. The method of claim 4, wherein the writing style of the user is provided by determining user text patterns in the second block of text to provide a series of user text rules, and using natural language processing to provide user text conclusions.

6. The method of claim 5, wherein comparison of the admired text conclusions to the user text conclusions provides the plurality of text editing rules.

7. The method of claim 1, wherein said editing the second block of text comprises a step of displaying to the user the second block of text changed to substantially match the model writing style; and providing the user an option to keep the second block of text changed to substantially match the model writing style.

8. The method of claim 1, wherein the sentiment comparison engine (SCE) is connected to a central services having a plurality of historical rules for measuring sentiments, wherein the central services automatically updates the historical rules by machine learning.

9. A system for editing text for sentiment comprising:
a sentiment analysis engine (SAE) for analyzing a first block of text as a template model, wherein a style of a text passage from the first block of text is selected, and from the analysis of the style of the text passage of the first block of text a model writing style is established;
a text segmenting application for parsing a second block of text into user text segments for analysis for a writing style of a user;
a sentiment comparison engine (SCE) for comparing text segments for analysis of user writing style with the model writing style of the user determined a plurality of text editing rules to modify said writing style of user to be substantially similar with the model writing style;
a sentiment editor for editing the second block of text with using the plurality of text editing rules to provide that the second block of text is changed to have a revised style with at least one of a message tone, dialect and personality similar to the model writing style; and
a display interface for presenting the second block of text in the model writing style to the user.

10. The system of claim 9, wherein the first block of text may be a sentence, paragraph, page or a book of text.

11. The system of claim 9, wherein the sentiment analysis engine (SAE) parses the model writing style by determining admired text patterns in the first block of text using a series of admired text rules, and using natural language processing to change the user text to best match the admired text.

12. The system of claim 11, wherein the sentiment comparison engine (SCE) parses the writing style of the user by determining user text patterns in the second block of text to using a series of user text rules, and using natural language processing to provide user text conclusions.

13. The system of claim 12, wherein the sentiment comparison engine (SCE) provides comparison of the admired text conclusions to the user text conclusions using the plurality of text editing rules.

14. A non-transitory computer readable storage medium comprising a computer readable program for editing text for sentiment, wherein the computer readable program when executed on a computer causes the computer to perform the steps of:
identifying a first block of text for use as a template modeling;
selecting a style of a text passage from the first block of text;
employing sentiment analysis engine (SAE) of the first block of text to establish a model writing style from the style of the text passage selected;
parsing a second block of text into user text segments for analysis for a writing style of a user;
comparing with a sentiment comparison engine (SCE) the text segments for analysis of user writing style in comparison with the model writing style to determine a plurality of text editing rules to modify said user writing style to be similar with the model writing style; and
editing the second block of text with a computer implemented sentiment editor using the plurality of text editing rules to provide that the second block of text is changed to have a revised style with at least one of a message tone, dialect and personality similar to the model writing style.

15. The non-transitory computer readable storage medium of claim 14, wherein the first block of text may be a sentence, paragraph, page or a book of text.

16. The non-transitory computer readable storage medium of claim 15, wherein the parsing a second block of text into user text segments may include segments of a number of words, segments of a number of sentences or segments of a number of paragraphs.

17. The non-transitory computer readable storage medium of claim 16, wherein comparison of the admired text conclusions to the user text conclusions using the plurality of text editing rules.

* * * * *